US008731014B2

(12) United States Patent
Allie et al.

(10) Patent No.: US 8,731,014 B2
(45) Date of Patent: May 20, 2014

(54) OUTPUT-POWER CONTROL APPARATUS FOR A $CO_2$ GAS-DISCHARGE LASER

(75) Inventors: David Allie, Storrs, CT (US); Joel Fontanella, Tolland, CT (US)

(73) Assignee: Coherent, Inc., Santa Clara, CA (US)

( * ) Notice: Subject to any disclaimer, the term of this patent is extended or adjusted under 35 U.S.C. 154(b) by 129 days.

(21) Appl. No.: 13/365,125

(22) Filed: Feb. 2, 2012

(65) Prior Publication Data
US 2013/0202004 A1 Aug. 8, 2013

(51) Int. Cl.
*H01S 3/13* (2006.01)

(52) U.S. Cl.
USPC .................................. 372/29.02; 372/29.021

(58) Field of Classification Search
CPC ........... H01S 3/10; H01S 3/13; H01S 3/1307; H01S 3/22; H01S 3/2232
USPC ................. 372/29.02, 29.021, 29.012, 38.01, 372/38.04
See application file for complete search history.

(56) References Cited

U.S. PATENT DOCUMENTS

| 4,276,513 | A | * | 6/1981 | Johnston et al. ................. 330/9 |
| 4,748,418 | A | | 5/1988 | Kerth |
| 5,638,389 | A | | 6/1997 | Nagano et al. |
| 5,793,092 | A | | 8/1998 | Habermeier et al. |
| 5,823,682 | A | | 10/1998 | Betz |
| 6,167,242 | A | | 12/2000 | Henderson et al. |
| 6,281,732 | B1 | | 8/2001 | Mirow |
| 6,781,450 | B1 | | 8/2004 | Mercer et al. |
| 6,803,555 | B1 | | 10/2004 | Parrish et al. |
| 7,133,074 | B1 | | 11/2006 | Brehmer et al. |
| 7,907,007 | B2 | | 3/2011 | Steele |
| 2004/0021840 | A1 | | 2/2004 | Heintze |

FOREIGN PATENT DOCUMENTS

| EP | 0537032 A1 | 4/1993 |
| EP | 1577990 A2 | 9/2005 |
| JP | 57-136382 A | 8/1982 |
| WO | 97/05678 A1 | 2/1997 |
| WO | 98/31082 A1 | 7/1998 |

OTHER PUBLICATIONS

International Search Report and Written Opinion received for PCT Patent Application No. PCT/US2013/023311, mailed on Sep. 3, 2013, 12 pages.

* cited by examiner

*Primary Examiner* — Armando Rodriguez
(74) *Attorney, Agent, or Firm* — Morrison & Foerster LLP

(57) ABSTRACT

A carbon-dioxide $CO_2$ gas-discharge laser is energized by the output a radio-frequency power supply (RFPS). Output-power of the laser is stabilized by adjustments of the RFPS responsive to periodic measurements of the laser output-power using detector output amplified by an amplifier. The amplifier has an offset-voltage which is subject to drift. A synchronous auto-zero arrangement is provided for canceling out the offset-voltage of the amplifier immediately prior to each periodic measurement of the laser output power.

13 Claims, 6 Drawing Sheets

OUTPUT-POWER CONTROL APPARATUS FOR A $CO_2$ GAS-DISCHARGE LASER

TECHNICAL FIELD OF THE INVENTION

The present invention relates in general to $CO_2$ gas-discharge lasers used in material processing applications. The invention relates in particular to electronic apparatus for stabilizing power output in such lasers.

DISCUSSION OF BACKGROUND ART

Some $CO_2$ laser material processing applications, such as glass or thin film cutting, require power output variations from the $CO_2$ laser to be about ±2% or less at output powers ranging from 100 Watts (W) to 1000 W. The laser discharge is typically driven by a radio-frequency power supply (RFPS). In most of these applications, the laser is operated in a pulsed mode, with repetition rates up to about 200 kilohertz (kHz). Power control is effected by taking a small portion (about 1% or less) of the output power, delivering that to a detector of some kind, amplifying a voltage output signal of the detector and using the amplified signal to adjust the RFPS to stabilize the output power at a desired value.

The effectiveness of this output power stabilization depends strongly on the detector used and the amplifier or amplifiers used to amplify the voltage output signal of the detector. A particular problem is that an amplifier (or amplifier stage) typically exhibits a characteristic offset-voltage that is amplified together with the input voltage to the amplifier.

For some sensors, such as thermocouples or photodetectors for example, extremely high amplifier gains (on the order of $10^4$ to $10^6$ or greater) may be required to produce a signal that is usable by subsequent signal-processing stages. At such high gains the offset-voltage of the amplifier alone may result in amplifier output voltages that either saturate or severely limit the dynamic range of the amplifier.

By way of example a representative precision amplifier from one manufacturer has an offset-voltage of 10 microvolts (μV) minimum and 125 μV maximum. Accordingly, for a total gain of 25,000 the offset-voltage alone results in unwanted variations ranging from about 0.25 V to over 3 V. With the trend to lower and lower supply voltages these output levels represent a serious limitation. This limitation is further compounded by drift of the offset-voltage that can be introduced by changes in temperature or device aging.

In order to address this limitation, IC amplifier suppliers have developed amplifiers that use active techniques to reduce both amplifier offset-voltage and drift. These amplifiers are usually termed auto-zero or chopper-stabilized amplifiers and employ various techniques to measure and remove the offset-voltage component from the amplifier's output signal. While the chopper-stabilized and the auto-zero amplifiers have notable differences both rely on switching techniques to achieve desired results. These switching techniques degrade both the noise performance and useful bandwidth of the amplifier.

FIG. 1 schematically illustrates a simplified prior-art arrangement 10 for controlling the average output power of a laser 12 driven by an RFPS 20. A small sample, for example about 1%, of the output beam of the laser is reflected by a low-reflecting mirror 14 and directed onto a photodetector 16, while major portion of the laser beam is propagated to the work piece. The detector provides a voltage output signal which varies in proportion to the reflected sample and, accordingly, in proportion to the output power of the laser. The signal output from detector 16 is connected to an electronic controller 18. A user sets a desired laser output power and other operational parameters via command signals provided to the controller. After appropriately scaling the signal from the detector, the controller compares the scaled signal to the power specified by the user. If the power is not as specified, the controller sends signals to the RFPS 20 to appropriately adjust the RF power delivered to the $CO_2$ laser discharge to maintain the laser output power at the level specified by the user.

In early infrared (IR) laser systems, detector 16 was a common thermopile or pyroelectric type IR detector. Due to certain limitations of these IR detectors, they found only limited use in commercial lasers. A significant limitation of the thermopile detectors was a slow response time, typically range of about one second, or somewhat less, at room temperature. Pyroelectric detectors had a relatively fast response of about 1 microsecond (μs) but a low output compared with that of the thermopile detector.

Recent commercial availability of fast response-time, conductively cooled, thermoelectric IR sensors based on epitaxial grown thin films of high temperature superconducting compounds, such as $YBa_2Ca_3O_7$ has renewed interest in active $CO_2$ laser output power control systems based on arrangement of FIG. 1. Such detectors have a response time that is comparable to that of a pyroelectric detector but having a DC output response comparable with that of the thermopile detector, albeit still relatively low. The faster response time enables wide-band control of the average laser output power even up to a pulse by pulse control. The detectors have an ability to handle high average power (on the order of tens of watts) without optical damage.

FIG. 2 schematically illustrates one prior-art arrangement of controller 18 in arrangement 10 of FIG. 1. In this arrangement detector 16 is assumed to be a thermo-electric IR detector of the type discussed above. Here, the controller includes an integrated circuit pre-amplifier (PA) 22, an analog-to-digital converter (A/D) 24, power control programmable logic 26, and pulse width modulation (PWM) circuitry 28. The signal from detector 16 is connected to pre-amplifier (PA) 22 the output of which is connected to A/D converter 24. The digitized output is delivered to power control logic 26 which is provided with digital commands (from a PC or the like) including a specified output power. The power control logic delivers digital signals to the PWM circuitry. This PWM circuitry delivers a pulse train to RFPS 20. The duty cycle (pulse duration divided by the pulse repetition period) sets the average power delivered by the RFPS. Typically the user sets the desired average laser power and pulse repetition rate and the PCL varies the duty cycle to maintain the laser output at the level specified by the user. Typical pulse repetition rates are in the range of 10 kHz to 200 kHz, with duty cycles ranging from 20% to 60%. This form of closed-loop control by pulse-width modulation is well known in the art and broadly applied in a variety of applications. Typically, the power control is effected by periodically measuring (with the control electronics) the output power during a time period when the laser is performing an application and correspondingly adjusting or not adjusting the RFPS output to stabilize the output power at the desired level. The measurement period is determined, inter alia, by parameters of the electronic control loop.

As noted above, there is a downward trend in the supply voltages used in modern integrated circuit amplifiers and reference voltages of modern A/D converters. This is driven by a variety of factors, but an end result is that typical integrated circuit amplifiers operate from a total supply voltage of 5 V or less. This limits the allowable A/D reference voltages to typical values of 4.096 V. Because of this, the A/D output scale-factors can range from 4 mV/W for a 1000 W laser to 40 mV/W for a 100 W laser. Due to the relatively low sensitivity of a thermo-electric detector the preamplifier gain required to provide a usable signal to the A/D converter 24 needs to be high, for example, on the order of 10,000. Such high gain results in large DC errors due to the amplification of the offset-voltage of the pre-amplifier.

Further as noted above, so-called auto-zero and chopper-stabilization techniques have been developed to attempt to deal with the problem of offset amplification, but these result in a high output-noise. This makes it necessary to severely limit the pre-amplifier bandwidth, and ultimately the control loop bandwidth, in order to maintain the necessary closed loop power stability. This bandwidth limitation results in laser material processing system throughputs that are far below the capabilities of present day technologies in high speed scanning mirrors, fast response IR detectors, and pulse performance of high power lasers. There is a need to find a solution for compensating the offset-voltage amplification that does not have significant noise as a by-product.

SUMMARY OF THE INVENTION

The present invention is directed to laser apparatus including a laser energized by an output of an energy source. The laser output-power is stabilized by periodic adjustment of the output of the energy source. In one aspect apparatus in accordance with the present invention comprise a detector arranged to receive a sample of the laser output and generate in response a voltage signal representative of the laser output-power. An amplifier is arranged to amplify the voltage signal generated by the detector. The amplifier has an offset-voltage characteristic of the amplifier but temporally variable depending on temporal variation of operating parameters of the amplifier. Electronic circuitry is provided for measuring the amplified voltage signal from the amplifier and making the periodic adjustment of the output of the energy source responsive to a corresponding periodic measurement of the amplified voltage signal and a stored value of a specified output-power of the laser. An arrangement is provided for canceling-out the instant amplifier offset-voltage from the amplified voltage signal prior to each periodic adjustment of the output of the energy source.

By synchronizing the offset-voltage cancelation (zeroing or nulling) and measurement operations with the overall execution of a closed-loop control algorithm the invention provides for superior performance while overcoming noise and drift problems associated with conventional auto-zero amplifiers, which operate autonomously.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
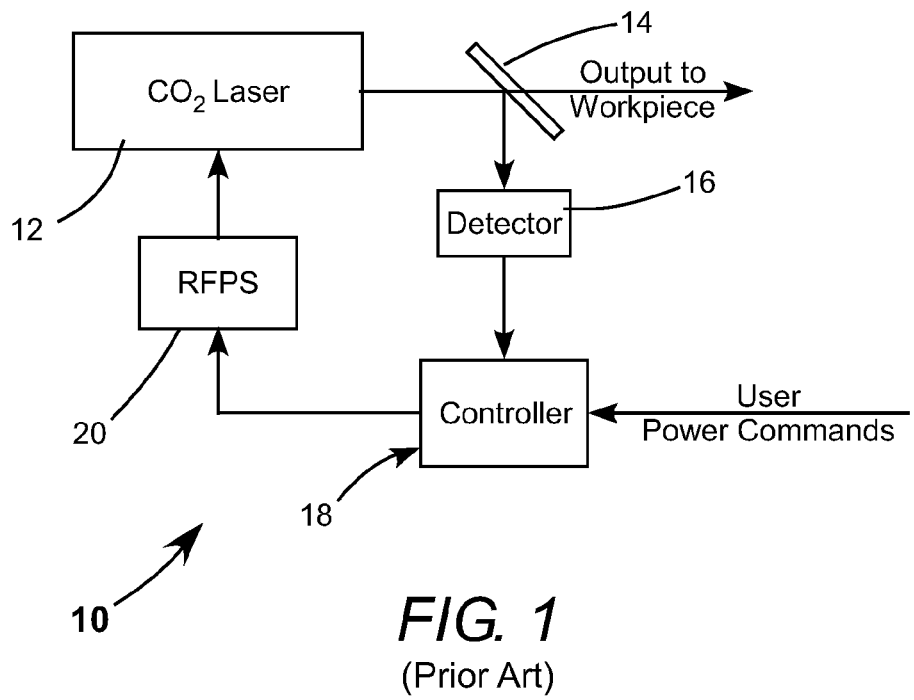
FIG. 1 schematically illustrates a prior-art output-power controlled $CO_2$ gas-discharge laser arrangement including a radio frequency power supply (RFPS) for energizing the laser, a detector for sampling the output power of the laser, and an electronic controller for periodically adjusting the output power of the RFPS, responsive to the detector output, for maintaining the laser output power at a user specified level.
Figure 2:
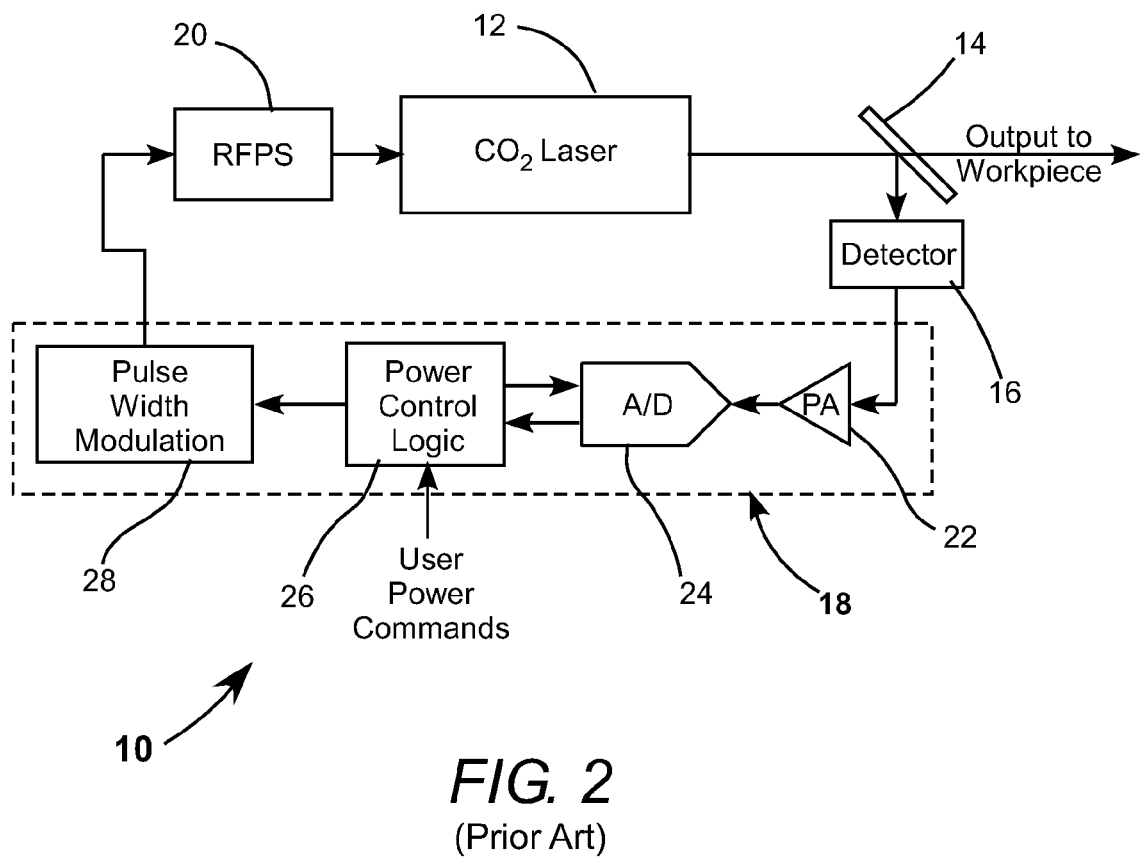
FIG. 2 schematically illustrates a typical prior-art arrangement of the controller in the arrangement of FIG. 1 including a pre-amplifier for amplifying the output of the detector, an analog-to-digital converter for digitizing the amplified output of the detector and delivering the digitized, amplified detector-output to power control logic circuitry, and pulse-width modulation circuitry for varying the average output power of the RFPS responsive to the digitized, amplified detector-output.
Figure 3:
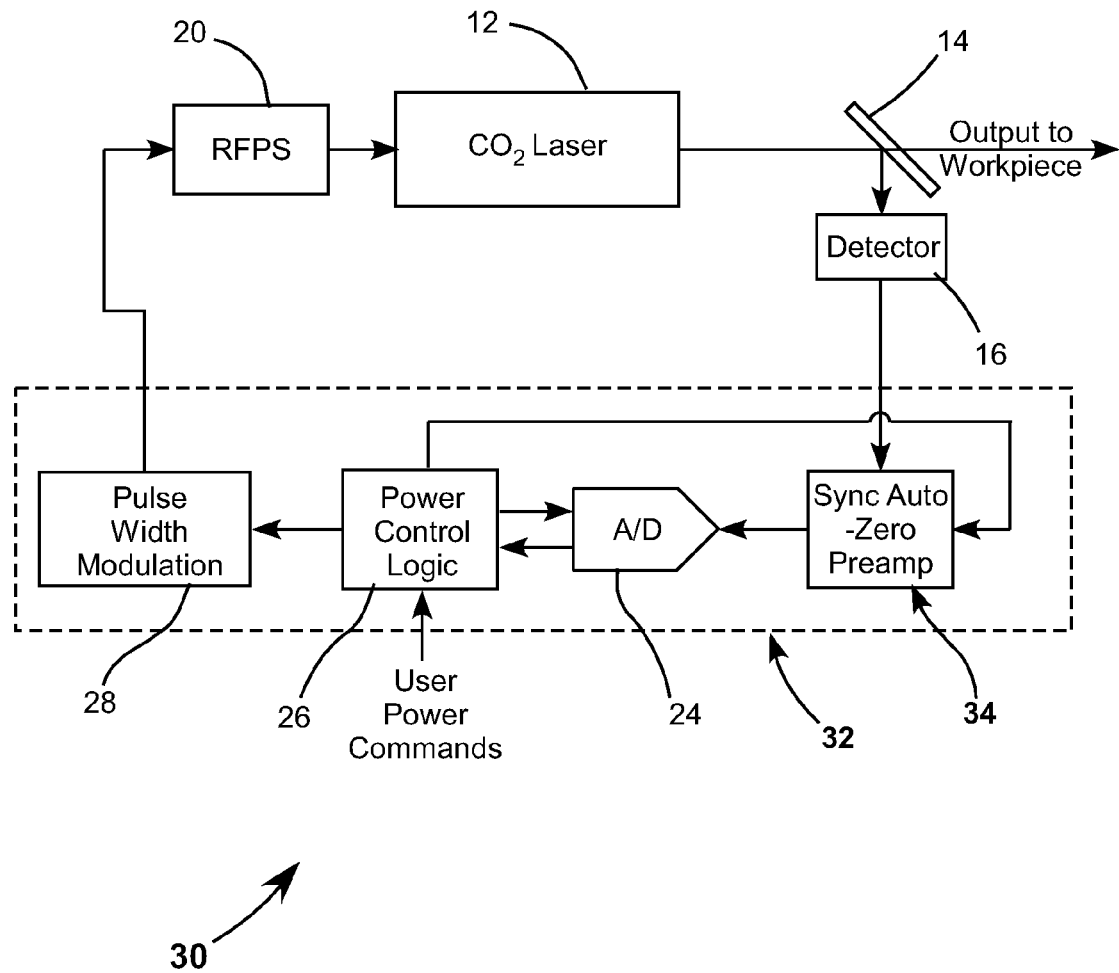
FIG. 3 schematically illustrates a preferred embodiment of an output-power controlled $CO_2$ gas-discharge laser arrangement in accordance with the present invention similar to the arrangement of FIG. 2 but wherein the pre-amplifier is replaced by a synchronous auto-zero amplifier the offset-voltage of which is synchronously zeroed responsive to a command from the power control logic prior to each periodic adjustment of the RFPS output.

Referring now to the drawings, wherein like components are designated by like reference numerals, FIG. 3 schematically illustrates a power-output controlled laser arrangement 30 in accordance with the present invention. Arrangement 30 is similar to arrangement 20 of FIG. 2 with an exception that controller 18 of arrangement 10 is replaced by a controller 32 in which the pre-amplifier 22 of controller 18 is replaced by an inventive auto-zero amplifier synchronized with pulsed operation of the laser by a signal delivered from power control logic 22.

The electrical signal from IR detector 16 is connected to synchronized auto-zero amplifier 34 which pre-amplifies the signal from the detector. Amplifier 34 provides an output voltage the amplitude of which is proportional to the laser output power and delivers the output voltage to A/D converter 24. The A/D converter samples the output of amplifier 34 converts the sampled voltage into a digital word and provides the digital word to power control logic 26.

Power control logic 26 includes a microcontroller, such as a model Microchip PIC18F6680 available from Microchip Technology Inc. of Chandler, Ariz., and issues necessary timing and control signals to the synchronous auto-zero preamplifier and the A/D 16 converter. A suitable A/D converter is a model AD7888 converter available from Analog Devices Inc. of Norwood, Mass. The power control logic also issues necessary control signals to pulse-width modulation circuitry 28. The pulse-width modulation circuitry varies the average output power of the repetitively pulsed laser RFPS 20 by varying the pulse width (and accordingly the duty cycle) of the RF pulses emitted by the RFPS, thereby varying the average output power of the laser. The pulse width modulator can be created on a programmable logic chip, such as a model number EPM 240 available from by Altera Corporation of San Jose, Calif. A suitable detector for detector 16 is a thermo-electric detector model number ALTP25/85, available from Fortech GmbH of Regensburg, Germany. As in the prior-art apparatus of FIG. 2, power control is effected by periodically measuring (with the control electronics) the output power during a time period when the laser is performing an application, and correspondingly adjusting or not adjusting the RFPS output to stabilize the output power at the desired level.

Figure 3A:
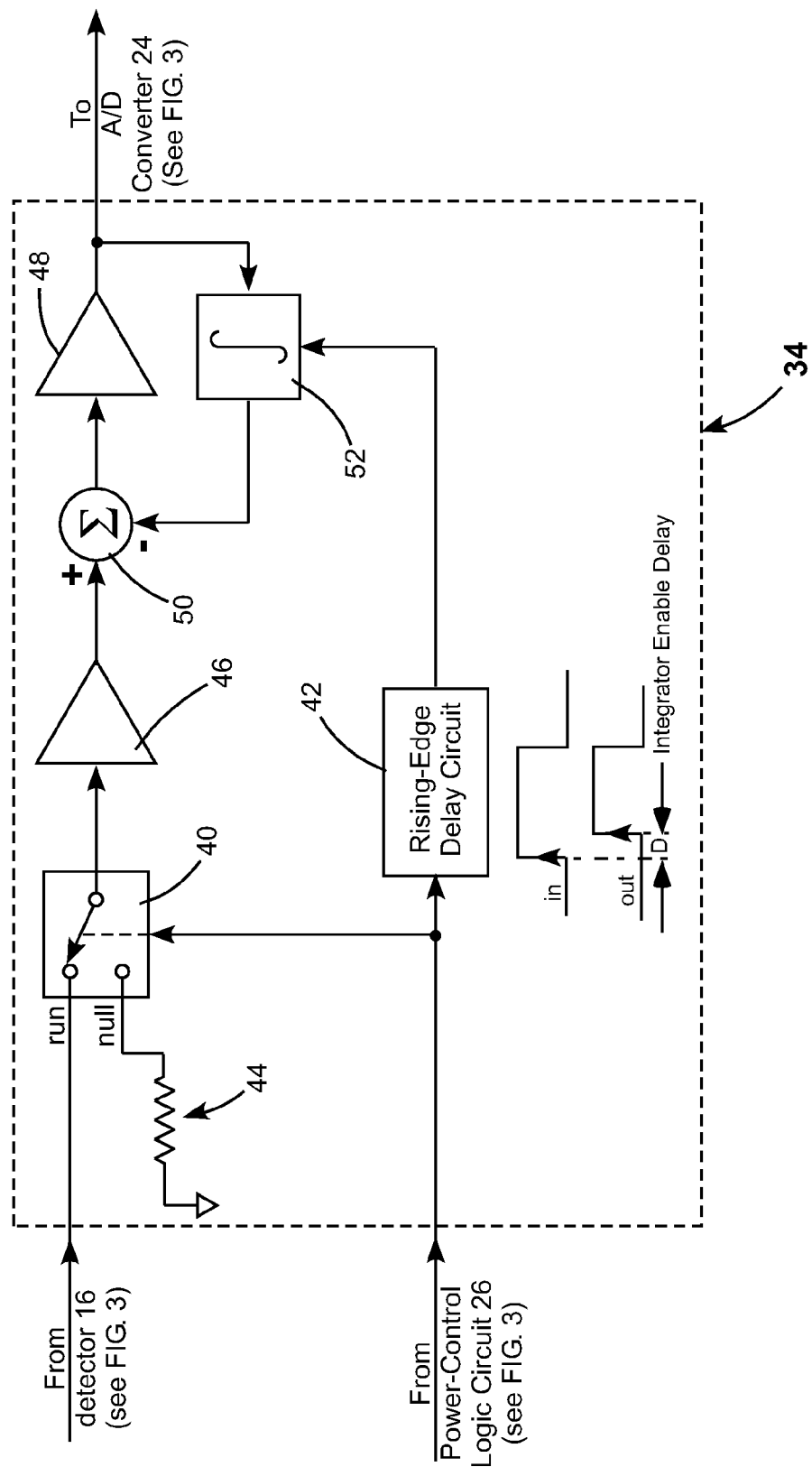
FIG. 3A is a high-level circuit diagram schematically illustrating one preferred embodiment of the synchronous auto-zero amplifier of FIG. 3.

FIG. 3A is a high-level circuit diagram schematically illustrates one preferred of synchronous auto-zero amplifier 34 in controller 32 of FIG. 3. The pulsed timing from power control logic 26 of FIG. 3 is provided as a control input to the synchronous auto-zero preamplifier and is connected simultaneously to an input of an analog switch 40, and to a rising edge delay circuit 42. One suitable analog switch is a model ADG819 available from Analog Devices Inc. One suitable rising edge delay circuit is a model LTC6994-1 available from Linear Technology Inc. of Milpitas, Calif.

The output of detector 16 is connected to the 0 (digital low) input of the analog switch. The 1 (digital high) input of the analog switch is connected to a dummy load 44, such as an appropriate resistor. When the switch 40 is connected to the detector 16, a signal relating to the laser power output is being processed by the auto-zero preamplifier circuitry. When the switch is connected to dummy load 44, the zero signal level is being established. To avoid possible saturation issues the overall preamp gain required is divided among several amplifier stages, here, a first amplifier stage 46 and a second amplifier stage 48.

The output of the analog switch 40 is connected to first amplifier stage 46 which is preferably a low noise, wide bandwidth operational amplifier. Unfortunately, such operational amplifiers have unacceptable DC offset and drift performance for this application, where very high overall amplifier gain is required. One example of such an operational amplifier is a model ADA4004-2 available from Analog Devices Inc.

To compensate for the DC offset-voltage of first amplifier stage 46, analog switch 40 is used to alternately sample the signal from detector 16 and dummy load 44 to establish a zero signal level. This measurement and nulling process is synchronized to the overall laser power control process by the signal from power-control logic 26 of FIG. 3. This provides the same DC precision as in the prior-art approaches without the noise and bandwidth limitations inherent therein.

After passing through a summing circuit 50, the output signal from the first stage gain amplifier is connected to second amplifier stage 48, which is preferably identical to first amplifier stage 46. The output signal from this second stage of amplification is connected to the input of A/D converter 24 of FIG. 3. This signal is also connected to the analog input of an integrate-and-hold circuit 52. A control (enable and disable) input signal to the integrate-and-hold circuit is the output of rising edge delay circuit 42 responsive to the signal from the power-control logic. The purpose of the rising-edge delay circuit is to time-delay the integrator enable signal by an amount D to allow for settling of two gain stages 46 and 48. The output of integrate-and-hold circuit 52 is then connected to summing circuit 50.

When the signal from power-control logic 26 is at logic one (high), the dummy load 44 is connected to amplifier stages via analog switch 40. This control signal, after a small time delay D to allow for settling of any transients induced by the operation of the analog switch, places the integrator in integrate mode. While the control signal is at logic one the offset-voltage of second amplifier stage 48 is integrated. The result of the integration is subtracted from the output of amplifier stage 46 by summing circuit 50 eventually driving the amplifier output toward zero and thereby and thereby toward nulling the offset-voltage from the combined amplifier output. Note that the nulling operation is essentially automatic as once the amplifier output reaches zero there is nothing left to subtract.

When a measurement of the detector signal is required, the control signal from power-control logic 26 is set to logic zero (low). This connects the detector output to the amplifier stages via analog switch 40 and places integrate-and-hold circuit in the hold state. The value established during the integrating (nulling) state is removed from the amplifier output by summing circuit 50.

Figure 4:
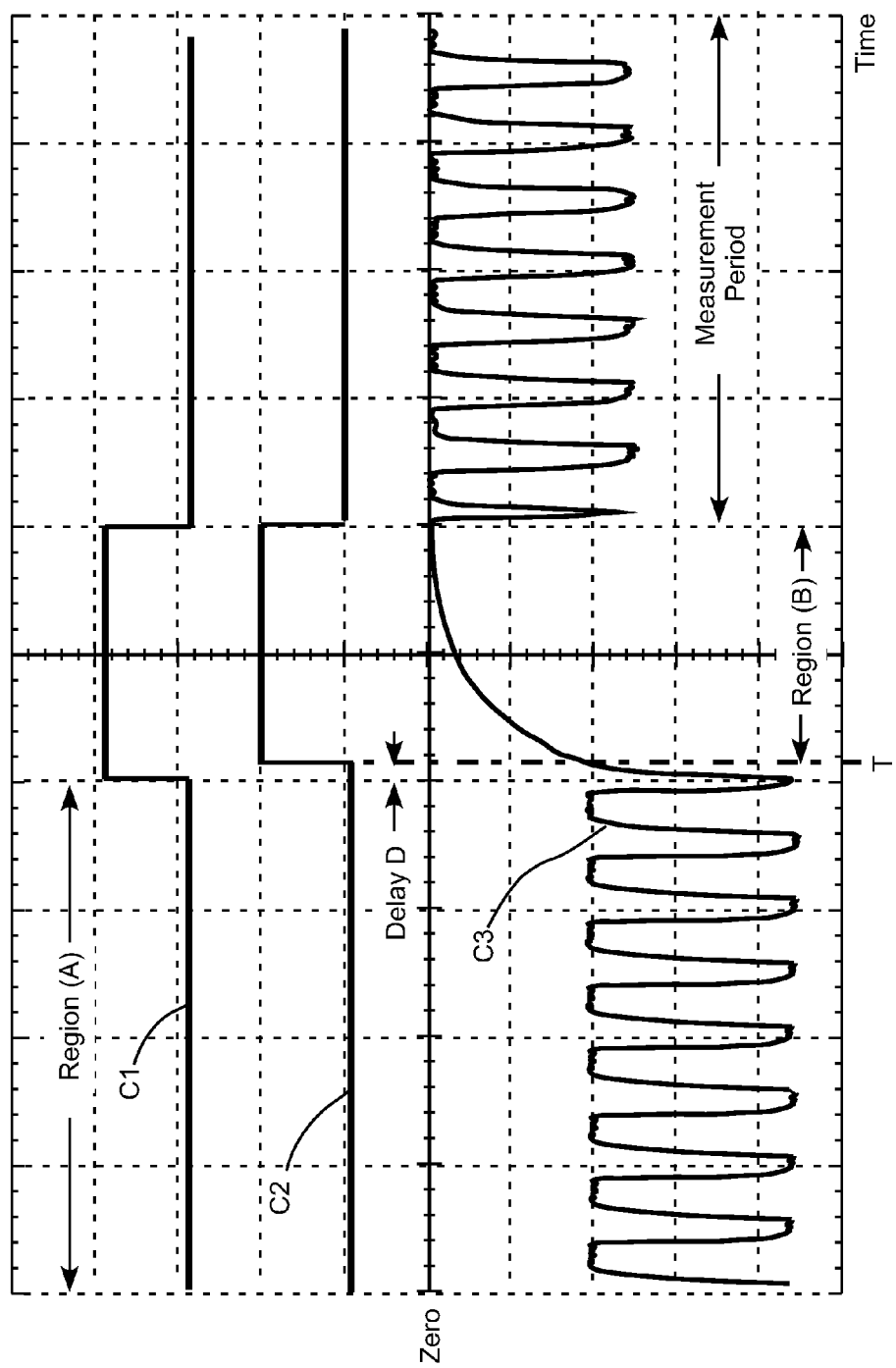
FIG. 4 is a timing diagram schematically illustrating an auto-zero command and the corresponding offset-voltage zeroing process in the synchronous auto-zero amplifier of FIG. 3A.

FIG. 4 is a timing diagram comprising a reproduction of oscilloscope traces C1, C2, and C3 simulating actual operation of the synchronous, auto-zero amplifier 32. Curve C1 is the input signal to rising-edge delay circuit 42; C2 is the rising-edge-delayed output signal from circuit 42 (curve C2 in FIG. 4); and C3 is the output waveform of second amplifier stage 48 of FIG. 3A. The time-scale for all curves is 1 millisecond (ms) per large division. The amplitude scale for curves is 5 V per large division with curves vertically offset to avoid overlap. The amplitude scale for curve C3 is 200 millivolts (mV) per large division, with the pulses, here, being negative-going pulses. The pulses have a pulse-repetition frequency (PRF) of 2 kHz with a 40% duty cycle. It should be noted that the (negative-going) rise and (positive-going) fall of the pulses would be dictated by signals (not shown) from the power-control logic.

Region A represents a time period of the timing diagram during which the laser is delivering pulses but during which a power-control measurement from the detector is not required. The signals of C1 and C2 are at digital low sand witch 40 connects the detector to the amplifier chain and integrating circuit 52 is in a hold mode with an arbitrary value held. For this simulation, there has been introduced, for demonstration purposes, an exemplary voltage offset in the amplifier output of about 400 m, resulting from an offset introduced by first amplifier stage 46 being amplified by second amplifier stage. In this region and other regions the desired PRF for laser pulses is initiated by the power-control logic.

At time T, when a power control measurement is required by the power control-loop (by power control logic 26 via A/D converter 24), the control signal represented by curve C1 is set to digital high. This connects switch 40 to dummy load 44 and disconnects the detector from the amplifier chain. Signal C2 from circuit 42 switches integrate-and-hold circuit 52 to the integrate mode, with the delay time D being selected such that the amplifier output has fallen to the "offset-zero" before the integrate mode of circuit 52 is enabled.

In region B, the DC output of amplifier stage 48 is integrated and the result subtracted from or added to the output of amplifier stage 46 until the output of amplifier stage 48 is driven to zero. The duration of the digital high period is selected to be long enough for this zeroing (nulling) to occur. The amount of time required to drive the offset-voltage to zero is determined by the specifics of the laser, the RFPS and the temperature behavior of the electronics.

At the end of that period, signals C1 and C2 both go to digital low, which reconnects switch 40 (and accordingly the amplifier stages) to the detector for measurements to me made. The integrate-and-hold circuit is simultaneously switched to the hold mode, and the held zeroing-voltage is subtracted from (or added to) the output of amplifier 46 until the beginning of another control-measurement period.

The data of FIG. 4 indicates that the inventive synchronous auto-zero amplifier can easily achieve a null during the 1.9 msec pulse-width (digital high period) of signal C2. If the digital-high pulse-duration of the signal C2 is not long enough to drive the DC offset to zero during the pulse duration, succeeding such pulses will continue to reduce the amount of DC voltage offset until a full null is achieved. Since power control logic has complete control over the zeroing (nulling) and measurement operations, the frequency and duration of these processes can be optimized based on the needs of the power-control loop.

Figure 5:
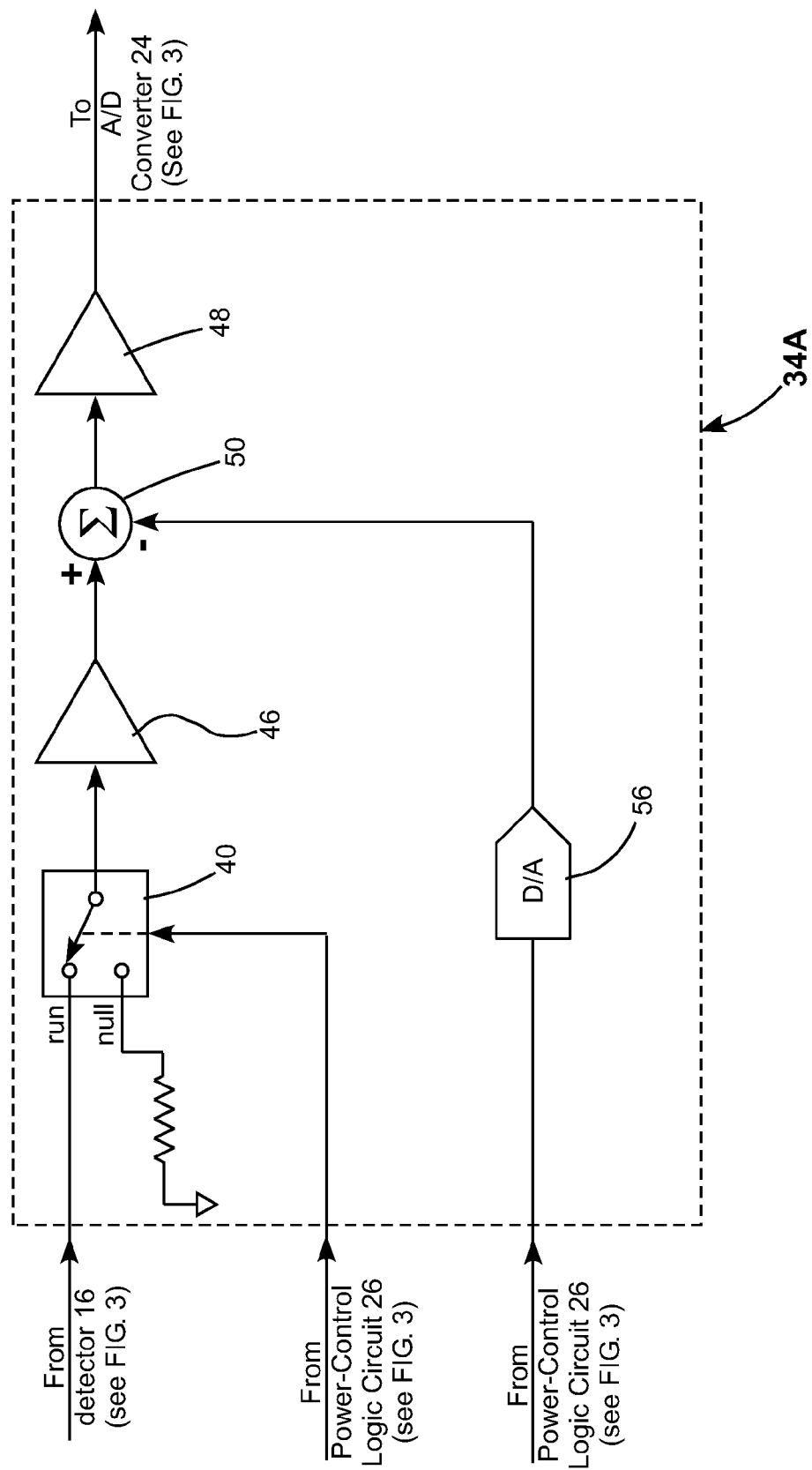
FIG. 5 is a high-level circuit diagram schematically illustrating another preferred embodiment of the synchronous auto-zero amplifier of FIG. 3A.

FIG. 5 is a circuit diagram schematically illustrating a variation 34A of a synchronous auto-zero amplifier in accordance with the present invention. This functionally similar to amplifier 34 of FIG. 3 inasmuch as offset-voltage zeroing operations are performed synchronously with each power measurement period of the power-control loop. In amplifier 34A, however, there is no analog integrate-and-hold circuit and the offset-voltage integration is performed digitally by power-control logic 26. The value to be subtracted by summing circuit 50 is provided as a digital signal from the power-control logic 26 data-bus and converted to a corresponding DC voltage by an digital-to-analog (D/A) converter 56 in amplifier 34A. This DC voltage is communicated to summing circuit 50 to perform the offset-voltage zeroing operation. One suitable D/A converter is a model number AD5412 available from Analog Devices Inc.

In situations where the output voltage offset is sufficiently small in magnitude, such that amplifier saturation is not a concern, the output offset compensation can be performed entirely within the microprocessor contained within power control logic 26 by merely subtracting the output voltage measured during the zeroing (nulling) operation in subsequent power measurement. This can be effected by suitably processing the microprocessor within power control logic 26, such that the DA converter and summing circuit of amplifier 34 can be omitted.

Figure 6:
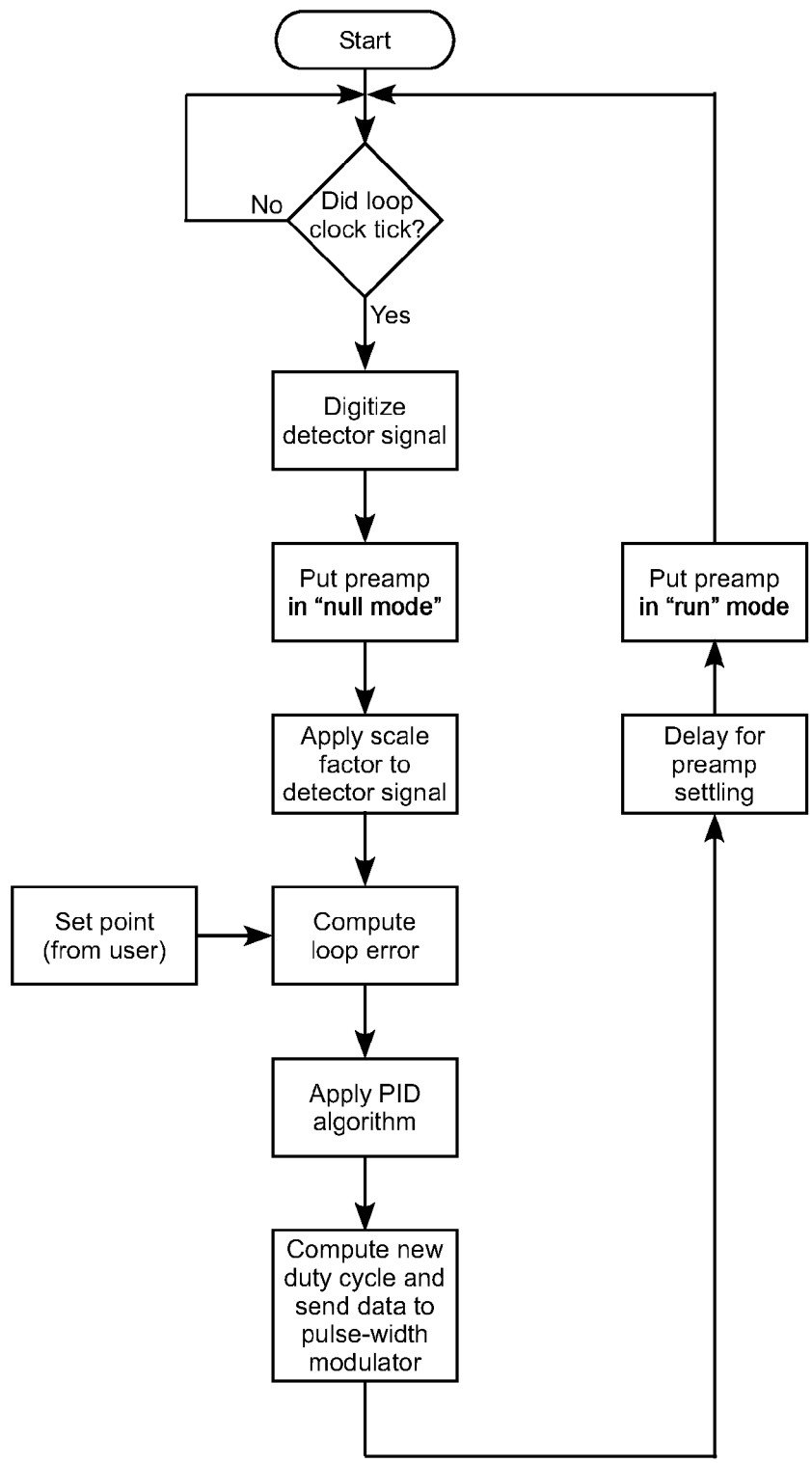
FIG. 6 is a flow-chart schematically illustrating one example of a control loop algorithm for operating an output-power controlled laser arrangement in accordance with the present invention.

FIG. 6 is flow chart schematically illustrating an exemplary control-loop algorithm for the method and apparatus of the present invention. Electronic circuitry of the apparatus includes a loop-clock which determines the rate at which the control-loop is executed. By way of example, if the clock "ticks" every 2 milliseconds, the loop will execute 500 times per second. At the beginning of the loop, the system waits for the clock to tick, and begins to execute the loop immediately after the tick occurs. Here it is assumed that the circuit is in a "run" mode with the detector connected via the preamplifiers to the measurement electronics. First, the output from the detector is digitized. Next, the preamplifier is put into a "null" mode, i.e., disconnected from the detector for cancelling out the amplified offset-voltage. Then, an appropriate scale factor is applied to the digitized detector signal, and the scaled optical power signal is compared to the power set-point to determine a loop-error corresponding to any difference between the instant and desired output power. The loop-error is then applied to a control algorithm, such as a proportional-integral-differential [PID] algorithm, which computes how to update the value of the PWM duty-cycle in order to drive the loop error toward zero, and the PWM output is updated with the new data. If additional time is needed at this point to complete the nulling phase of the preamp, a delay can be inserted here. Following that delay (if any), the preamplifier is returned to the "run" mode, i.e., reconnected to the detector. At this point, the algorithm returns to the beginning of the control sequence and waits for the next tick of the clock. It should be noted that the preamplifier could be switched between "null" and "run" at different places in the control-loop sequence, provided sufficient time is allowed for settling of pre-amplifier.

Those skilled in the art to which the invention pertains will recognize that while the present invention is described in the context of controlling the output power of a $CO_2$ gas-discharge laser, the invention is applicable to controlling the output power of any laser arranged such that output power can be controlled by adjusting the output power of an energizing source for the laser. The invention is described above in terms of preferred embodiments. The invention is not limited, however, to the embodiments described and depicted. Rather the invention is defined by the claims appended hereto.

What is claimed is:

1. Laser apparatus including a laser energized by an output of an energy source, wherein the laser output-power is stabilized by periodic adjustment of the output of the energy source, the invention comprising:

a detector arranged to receive a sample of the laser output and generate in response a voltage signal representative of the laser output-power;

an amplifier arranged to amplify the voltage signal generated by the detector, the amplifier having an offset-voltage characteristic that is temporally variable depending on temporal variation of the operating parameters of the amplifier;

electronic circuitry for measuring the amplified voltage signal from the amplifier and making the periodic adjustment of the output of the energy source responsive to a corresponding periodic measurement of the amplified voltage signal and a stored value of a specified, output-power of the laser, said electronic circuitry canceling-out an instant amplifier offset-voltage from the amplified voltage signal prior to each periodic adjustment of the output of the energy source; and wherein the electronic circuitry includes a switch operated by the electronic circuitry for disconnecting the detector from the amplifier prior to making the periodic adjustment of the output of the energy source and re-connecting the detector to the amplifier after making the periodic adjustment of the output of the energy source.

2. The apparatus of claim 1, wherein the detector is a thermo-electric detector.

3. Radio-frequency (RF) powered gas-discharge laser apparatus with stabilized output power, comprising:

a RF power supply (RFPS) having an RF power-output energizing the laser apparatus;

a detector arranged to receive a sample of the laser output-power and generate in response a voltage signal representative of the laser output-power;

an amplifier arranged to amplify the voltage signal generated by the detector, the amplifier having an offset-voltage characteristic that is temporally variable depending on temporal variation of the operating parameters of the amplifier;

electronic circuitry for measuring the amplified voltage signal from the amplifier and making the periodic adjustment of the output of the RFPS power-output responsive to a corresponding periodic measurement of the amplified voltage signal and a stored value of a specified, output-power of the laser, said electronic circuitry for canceling-out an instant amplifier offset-voltage from the amplified voltage signal prior to each periodic adjustment of the RFPS power-output; and wherein the electronic circuitry includes a switch operated by the electronic circuitry for temporarily averting the voltage signal from the detector away from the amplifier to allow an instant offset-voltage of the amplifier to be determined prior to making the periodic adjustment of the output of the power output of the RFPS.

4. The apparatus of claim 3, wherein the RFPS delivers a train RF pulses for operating the gas-discharge laser in a pulsed mode, the train of RF pulses having a duty-cycle, and wherein the RFPS power-output is adjusted by adjusting a duty-cycle of the RF pulses.

5. The apparatus of claim 3, wherein the detector is a thermo-electric detector.

6. Radio-frequency (RF) powered gas-discharge laser apparatus with stabilized output power, comprising:

a RF power supply (RFPS) having an RF power-output energizing the laser apparatus;

a detector arranged to receive a sample of the laser output-power and generate in response a voltage signal representative of the laser output-power;

an amplifier including first and second amplification stages to amplify the voltage signal generated by the detector, the amplifier having an offset-voltage characteristic that is temporally variable depending on temporal variation of the operating parameters of the amplifier, and each of the amplifier stages having an input and an output;

a summing circuit having first and second inputs and an output, with the first input thereof connected to the output of the first amplifier stage and the output thereof connected to the input of the second amplifier stage;

an integrate-and-hold circuit in a feedback loop between the output of the second amplifier stage and second input of the summing circuit, the integrate and hold circuit switchable between an integrate-mode or a hold-mode;

a switch arranged to alternatively connect the detector to or disconnect the detector from the amplifier;

electronic circuitry for measuring the amplified voltage signal from the amplifier and making the periodic adjustment of the output of the RFPS power-output responsive to a corresponding periodic measurement of the amplified voltage signal and a stored value of an output-power at which the output-power of the laser is to be stabilized; and wherein the electronic circuitry is arranged cooperative with the switch and the integrate-and-hold circuit such that prior to making the periodic adjustment of the output of the RFPS, the detector is disconnected from the amplifier and the integrate-and-hold circuit is switched to the integrate-mode and cooperative with the summing circuit drives the amplifier output toward zero for canceling out the offset voltage of the amplifier, then the detector is connected to the amplifier and the integrate-and-hold circuit is switched to the hold-mode for measuring the amplified voltage signal from the amplifier.

7. The apparatus of claim 6, wherein the RFPS delivers a train RF pulses for operating the gas-discharge laser in a pulsed mode, the train of RF pulses having a duty-cycle, and wherein the RFPS power-output is adjusted by adjusting a duty-cycle of the RF pulses.

8. The apparatus of claim 6, wherein the detector is a thermo-electric detector.

9. Radio-frequency (RF) powered gas-discharge laser apparatus with stabilized output power, comprising:

a RF power supply (RFPS) having an RF power-output energizing the laser apparatus;

a detector arranged to receive a sample of the laser output-power and generate in response a voltage signal representative of the laser output-power;

an amplifier including first and second amplification stages to amplify the voltage signal generated by the detector, the amplifier having an offset-voltage characteristic that is temporally variable depending on temporal variation of the operating parameters of the amplifier, and each of the amplifier stages having an input and an output;

a summing circuit having first and second inputs and an output, with the first input thereof connected to the output of the first amplifier stage, the second input thereof being connected to a digital to analog converter, and the output thereof connected to the input of the second amplifier stage;

a switch arranged to alternatively connect the detector to or disconnect the detector from the amplifier;

electronic circuitry for measuring the amplified voltage signal from the amplifier and making a periodic adjustment of the output of the RFPS power-output responsive to a corresponding periodic measurement of the amplified voltage signal and a stored value of an output-power at which the output-power of the laser is to be stabilized; and wherein the electronic circuitry is arranged cooperative with the switch such that prior to making the periodic adjustment of the output of the RFPS, the detector is disconnected from the amplifier and electronic circuitry digitally records the amplifier output as a value representative of an instant offset-voltage of the amplifier, and when the switch reconnects the detector to the amplifier the digital to analog converter converts the recorded digital offset-voltage value to an analog offset-voltage which is subtracted from the output of the first amplifier stage prior to measuring the amplifier output for making the periodic adjustment of the output of the RFPS.

10. The apparatus of claim 9, wherein the RFPS delivers a train RF pulses for operating the gas-discharge laser in a pulsed mode, the train of RF pulses having a duty-cycle, and wherein the RFPS power-output is adjusted by adjusting a duty-cycle of the RF pulses.

11. The apparatus of claim 9, wherein the detector is a thermo-electric detector.

12. A method of controlling the operation of a pulsed gas laser system, said system including a gas laser energized by a power supply in order to generate a radiation beam for treating a workpiece, and wherein a portion of the radiation beam is picked off and delivered to a detector for generating output signals corresponding to the power of the beam, with the output signals being delivered to a circuit for controlling the power supply, said circuit including an amplifier for amplifying the output signals generated by the detector, said method comprising:

disconnecting the output of the detector from the amplifier;
determining an offset voltage generated by the amplifier; and
reconnecting the amplifier to the output of the detector and generating control signals to the power supply modified by the determined offset voltage.

13. A method as recited in claim 12 wherein the signals to the power supply are modified by subtracting the determined offset voltage from the output of the amplifier.

* * * * *